(12) United States Patent
Togo et al.

(10) Patent No.: US 6,345,120 B1
(45) Date of Patent: Feb. 5, 2002

(54) IMAGE PROCESSING SYSTEM, IMAGE DATA TRANSMISSION AND RECEPTION APPARATUS, AND IMAGE PROCESSING METHOD

(75) Inventors: Tsutomu Togo; Kiyoshi Sakai, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/057,311

(22) Filed: Apr. 8, 1998

(30) Foreign Application Priority Data

Oct. 17, 1997 (JP) ............................................. 9-285640

(51) Int. Cl.[7] .............................................. G06K 9/36
(52) U.S. Cl. ...................................... 382/232; 348/590
(58) Field of Search .......................... 382/232; 348/590, 348/597; 283/62, 117; 359/464; 360/72.2; 386/111

(56) References Cited

U.S. PATENT DOCUMENTS

| | | | | |
|---|---|---|---|---|
| 5,063,437 A | * | 11/1991 | Owashi et al. ................. 358/22 |
| 5,257,104 A | * | 10/1993 | Asai ............................ 358/147 |
| 5,389,973 A | * | 2/1995 | Kitamura et al. ............. 348/405 |
| 5,412,487 A | * | 5/1995 | Nishimura et al. ........... 358/452 |
| 5,596,419 A | * | 1/1997 | Yoshimura et al. ............ 386/52 |
| 5,649,047 A | * | 7/1997 | Takahashi et al. ............ 386/111 |
| 5,835,671 A | * | 11/1998 | Kitamura et al. .............. 386/97 |
| 5,915,263 A | * | 6/1999 | Maeda ........................ 711/154 |

FOREIGN PATENT DOCUMENTS

JP 6-054325 2/1994 .......... H04N/7/173

* cited by examiner

*Primary Examiner*—Jose L. Couso
*Assistant Examiner*—Anh Hong Do
(74) *Attorney, Agent, or Firm*—Rosenman & Colin LLP

(57) ABSTRACT

An image processing system which efficiently generates a desired special effect with a simple circuit. In order to add special effects to a given source picture, a target area specifying unit first specifies a target area, as part of the given source picture, which is to be subjected to a special effect generation process. The source image is coded by an image data coding unit, and the resultant coded data is then modified by a target data relocation unit, Here, part of the coded data, or target data in the target area, is extracted and relocated from its original field to a different field of the coded data. An image data transmission unit transmits the coded bitstream which contains the relocated target data. At the receiving ends, a target data extraction unit extracts the target data from the received coded bitstream, which is then saved into a target data storage unit. A data reproduction unit reproduces the original coded data or imperfect coded data from the received data, where the latter lacks the target data. The data decoding unit decodes the coded data or the imperfect coded data to reconstruct a picture.

10 Claims, 7 Drawing Sheets

IMAGE PROCESSING SYSTEM, IMAGE DATA TRANSMISSION AND RECEPTION APPARATUS, AND IMAGE PROCESSING METHOD

BACKGROUND OF THE INVENTION

1. Field of the Invention

The present invention relates to image processing systems, image data transmission apparatus, image data reception apparatus, and image processing methods. The present invention relates more particularly to an image processing system for applying a special effect generation process to given source pictures, an image data transmission apparatus for transmitting image data after applying a special effect generation process to given source pictures, an image data reception apparatus for receiving image data which has been manipulated by a special effect generation process, and an image processing method for applying a special effect generation process to given source pictures.

2. Description of the Related Art

MPEG (Moving Pictures Experts Group) standard coding techniques, a key technology in the multimedia age, are designed to process video images and associated audio and data in an integrated way, covering a wide range of applications including the use in local area networks (LAN) and broadcasting services. In recent years, the widespread proliferation of multimedia contents, as well as the increasing use of digital video compression techniques including MPEG, has enabled the consumers to enjoy a variety of video programs supplied from service providers in convenient and economical ways. Video on demand (VOD), for example, is a technology that makes this possible.

While such systems have enough capabilities to supply the users with high quality visual information of any kind on their requests, there are potential risks of violating legal rules and social guidelines in this shared audio and video environment. More specifically, immature users have to be protected from exposure to some classes of visual materials deemed inappropriate. Copyrighted pictures should not be circulated without permission of the copyright holder. Because of the increasing awareness of such potential problems, the providers control their own service contents by embedding some protection data into source pictures or using other special effect techniques to manipulate the source data.

Japanese Patent Application Laid-open Publication No. 6-54325 (1994), for instance, proposes a technique to reproduce images at remote sites. In this proposed system, the sender encrypts image data after applying orthogonal transform, and the receiving terminals reproduce the images with different quality levels determined in accordance with the decryption functions furnished therein.

It should be noted that the above proposed technique relies on a data encryption process to control the quality of reproduced pictures. This actually requires the sender to incorporate additional special circuitry for encryption, besides causing an increase in the volume of coded data.

SUMMARY OF THE INVENTION

Taking the above into consideration, a first object of the present invention is to provide an image processing system which can apply a special effect generation process with a simple circuit in an efficient way.

A second object of the present invention is to provide an image transmission apparatus which transmits image data after applying a special effect generation process to given source pictures, with a simple circuit in an efficient way.

A third object of the present invention is to provide an image data reception apparatus which receives image data which has been manipulated by a special effect generation process, with a simple circuit in an efficient way.

A fourth object of the present invention is to provide an image processing method for efficiently applying a special effect generation process to given source pictures with a simple circuit configuration.

To accomplish the first object, there is provided an image processing system for applying a special effect generation process to a given source picture. This system comprises (a) an image data transmission apparatus and (b) an image data reception apparatus.

The image data transmission apparatus comprises: (a1) a target area specifying unit for specifying a target area of the given source picture that is to be subjected to the special effect generation process; (a2) an image data coding unit for generating coded data by encoding the source picture, (a3) a target data relocation unit for extracting target data from the coded data generated by the coded data generating unit and relocating the target data from an original field thereof to a different field of the coded data to obtain a coded bitstream for transmission, the target data being part of the coded data that is corresponding to the target area specified by the target area specifying unit, and (a4) an image data transmission unit for transmitting the coded bitstream obtained by the target data relocating unit.

The image data reception apparatus receives the coded bitstream from the image data transmission apparatus, which comprises: (b1) a target data extraction unit for extracting the target data from the received coded bitstream; (b2) a target data storage unit for storing the target data extracted by the target data extraction unit; (b3) a data reproduction unit for reproducing original coded data from the received coded bitstream by restoring the target data into the original field thereof, or reproducing imperfect coded data from the received coded bitstream without restoring the extracted target data; and (b4) a data decoding unit for decoding the original coded data or the imperfect coded data supplied from the data reproduction unit.

Further, to accomplish the second object, there is provided an image data transmission apparatus for transmitting image data after applying a special effect generation process to a given source picture. This apparatus comprises: (a) a target area specifying unit for specifying a target area of the given source picture that is to be subjected to the special effect generation process; (b) an image data coding unit for generating coded data by encoding the source picture; (c) a target data relocation unit for extracting target data from the coded data generated by the coded data generating unit and relocating the target data from an original field thereof to a different field of the coded data to obtain a coded bitstream for transmission, the target data being part of the coded data that is corresponding to the target area specified by the target area specifying unit; and (d) an image data transmission unit for transmitting the coded bitstream obtained by the target data relocating unit.

Moreover, to accomplish the third object, there is provided an image data reception apparatus for receiving image data that has been manipulated with a special effect generation process. This image data reception apparatus comprises: (a) a target data extraction unit for extracting target data from the received image data, the target data being part of the image data that has been subjected to the special effect generation process; (b) a target data storage unit for storing the target data extracted by the target data extraction unit; (c) a data reproduction unit for reproducing original coded data from the received image data by restoring the target data into an original field thereof, or reproducing imperfect coded data from the received image data without restoring the target data; and (d) a data decoding unit for decoding the original coded data or the imperfect coded data supplied from the data reproduction unit.

Furthermore, to accomplish the fourth object, there is provided an image processing method for applying a special effect generation process to a source picture. This method comprises the steps of: (a) specifying a target area of the given source picture as a subject of the special effect generation process; (b) compressing the given source picture by using discrete cosine transform coding techniques to produce coded data; (c) extracting target data out of the coded data, which corresponds to the target area, and relocating the target data to a different field of the coded data to obtain a coded bitstream for transmission, wherein the target data is part of the coded data that is corresponding to the target area; (d) transmitting the coded bitstream; (e) extracting the target data from the coded bitstream; (f) saving the extracted target data into storage; (g) reproducing original coded data from the coded bitstream by restoring the target data into an original location thereof, or reproducing imperfect coded data from the coded bitstream without restoring the extracted target data; and (h) decoding the coded data or the imperfect coded data.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Several embodiments of the present invention will be described below with reference to the accompanying drawings.

Figure 1:
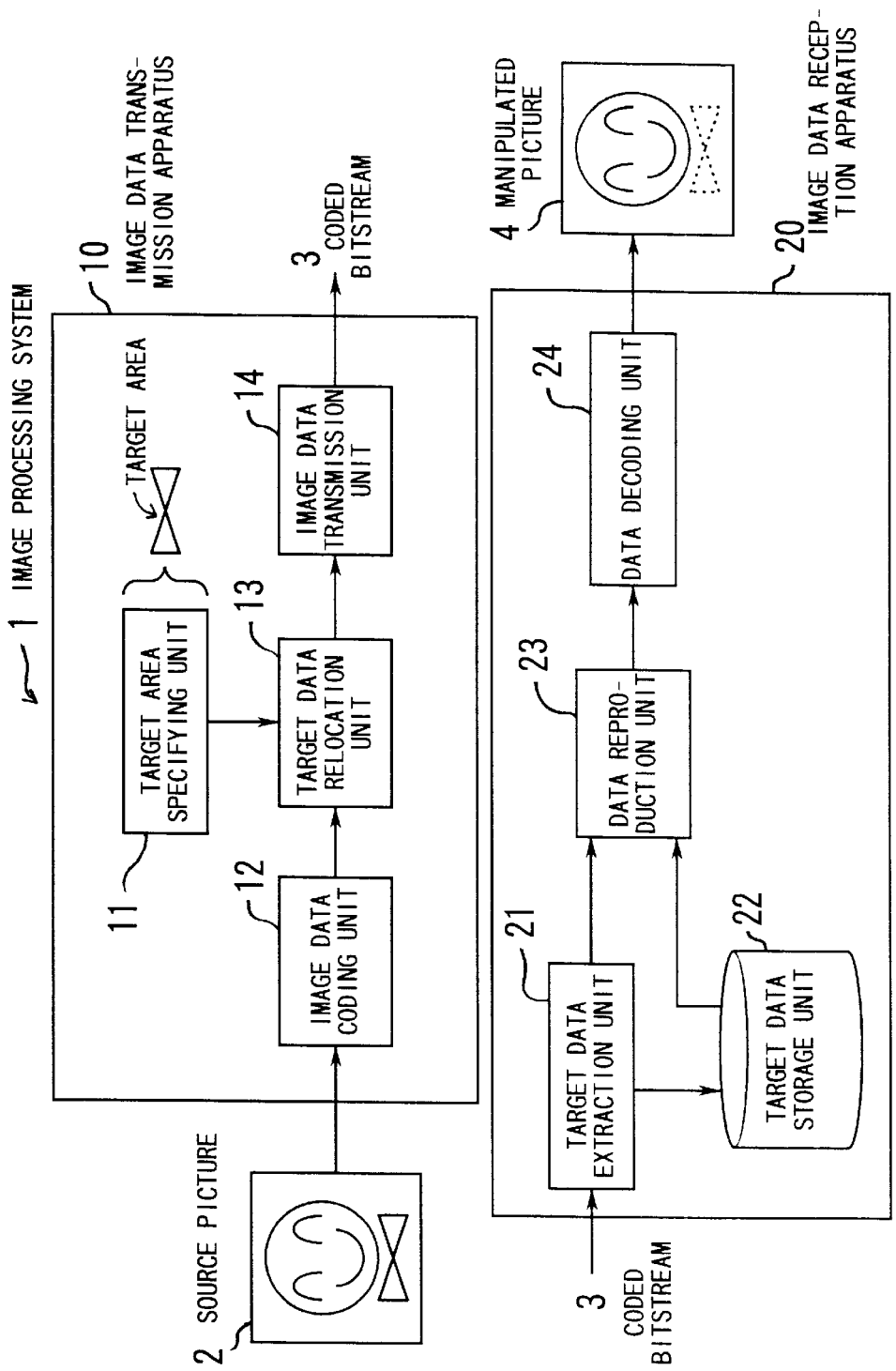
FIG. 1 is a conceptual view of an image processing system of the present invention.

FIG. 1 shows the concept of an image processing system 1 proposed in the present invention. This image processing system 1, comprising an image data transmission apparatus 10 and an image data reception apparatus 20, is designed to apply a special effect generation process to a source picture 2 before presenting it to users. Here, the term "special effect" denotes a partial picture modification yielding special image patterns such as mosaic and rotation. Particularly, in the present invention, the special effect generation process adds the blurriness to part of given source pictures.

The image data transmission apparatus 10 has a target area specifying unit 11 to specify a target area of the given source picture 2 that is to be subjected to the special effect generation process. An image data coding unit 12 encodes the source picture 2 by executing discrete cosine transform (hereafter, "DCT"), thereby generating transform coefficients, or "coded data," having a prescribed data field format. A target data relocation unit 13 then extracts "target data" from the coded data and relocates the extracted target data from its original field to a different field of the same coded data, thus obtaining a coded bitstream 3 for transmission.

Here, the term "target data" refers to a part of the coded data that is corresponding to the target area specified by the target area specifying unit. More specifically, the coded data actually contains DCT coefficients, or a spectrum of spatial frequency components, of each block of the source picture 2. The "target data" is a predetermined range of spatial frequency components of particular blocks included in the specified target area. The target data relocation unit 13 inserts the extracted target data to a specific field of the coded data, called "user data field," as will be described in detail later on. Finally, the coded bitstream 3 produced by the target data relocation unit 13 is transmitted to the image data reception apparatus 20 through an image data transmission unit 14.

Inside the image data reception apparatus 20, a target data extraction unit 21 extracts the target data from the received coded bitstream 3, and a target data storage unit 22 saves the extracted target data. A data reproduction unit 23 then reproduces "original coded data" from the received coded bitstream 3 by restoring the target data to its original field. Alternatively, the data reproduction unit 23 reproduces "imperfect coded data" from the received coded bitstream without restoring the target data.

With an appropriate selection signal, a data decoding unit 24 decodes either the original coded data or the imperfect coded data supplied from the data reproduction unit 23. When the original coded data, which has the target data restored in the right field location, is given, the data decoding unit 24 can reproduce a complete image which is substantially equal to the source picture 2. In contrast to this, when the imperfect coded data is given, it produces a manipulated picture 4 with the intended special effect; that is, a partially blur image is obtained.

Figure 2:
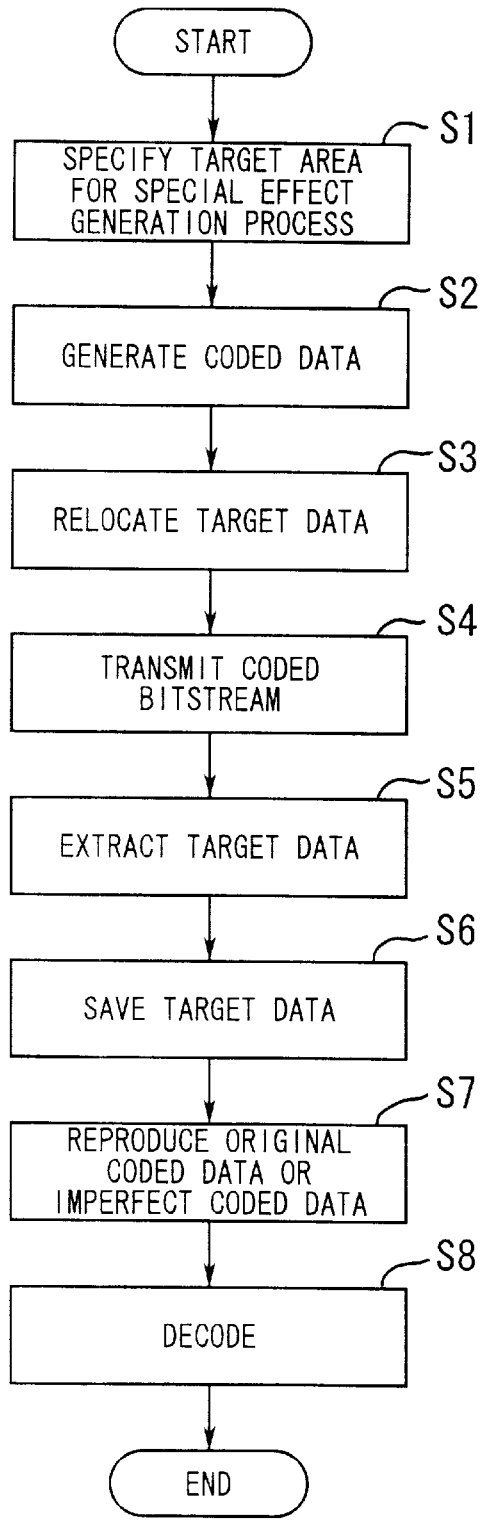
FIG. 2 is a flowchart which shows the operation of the image processing system of the present invention.

The operation of the image processing system 1 is described in the form of a flowchart of FIG. 2, where the following steps S1 to S8 are executed.

(S1) The target area specifying unit 11 specifies a target area of the given source picture 2 that is to be subjected to the special effect generation process.

(S2) The image data coding unit 12 generates coded data by encoding the source picture 2.

(S3) Out of the coded data generated in step S2, the target data relocation unit 13 extracts target data for the given target area and relocates the extracted target data from its original field to a different data field of the same coded data. As a result, a coded bitstream 3 is obtained.

(S4) The image data transmission unit 14 transmits the coded bitstream 3.

(S5) The target data extraction unit 21 extracts the target data from the coded bitstream 3.

(S6) The target data storage unit 22 saves the target data into storage.

(S7) The data reproduction unit 23 then reproduces the original coded data from the received coded bitstream 3 by restoring the target data to its original data field. Alternatively, it reproduces imperfect coded data from the received coded bitstream without restoring the target data.

(S8) The data decoding unit 24 decompresses the coded data or the imperfect coded data.

The following paragraphs will now present a specific example of the above-described image processing system 1. Here, the present invention is implemented in an MPEG coder and decoder system.

Figure 3:
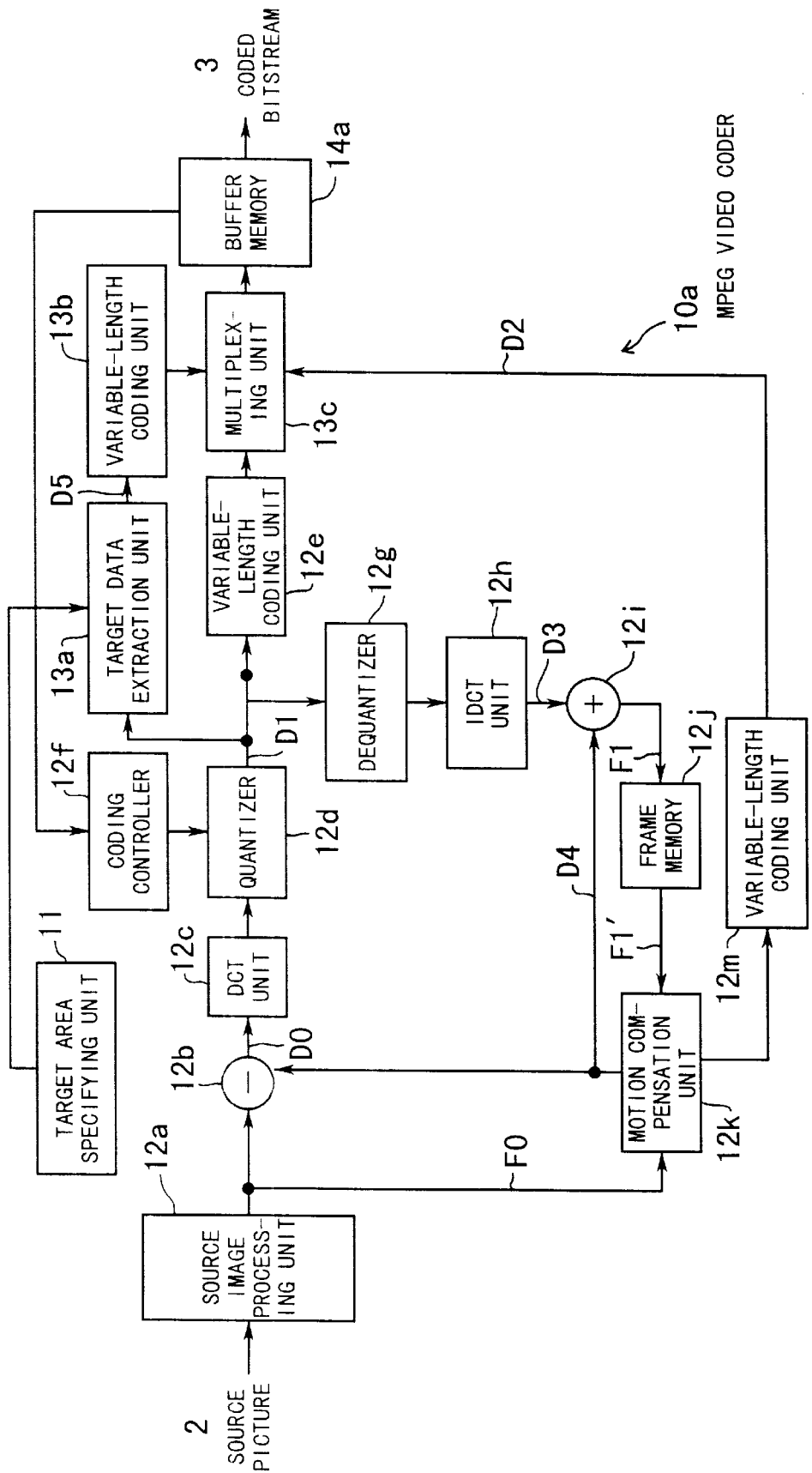
FIG. 3 is a block diagram of an MPEG video coding apparatus where the present invention is embodied.

FIG. 3 is a block diagram of an MPEG video coder 10a employing a hybrid coding system which combines DCT spatial compression coding with motion compensated frame prediction techniques. This system computes prediction errors by using motion compensated prediction algorithms and compresses the prediction errors by DCT techniques.

Upon receipt of a source picture 2, a source image processing unit 12a preprocesses it by, for example, dividing each frame into blocks. On an individual block basis, a DCT unit 12c transforms the given source picture 2 or the prediction error DO calculated by a subtractor 12b, thereby yielding DCT transform coefficients. A coding controller 12f determines the quantization step size. With the quantization step size determined by the coding controller 12f, the quantizer 12d quantizes the DCT transform coefficients, thus generating coded data D1.

A variable-length coding unit 12e further compresses the coded data D1 by variable-length coding techniques. A multiplexing unit 13c combines the output of the variable-length coding unit 12e and that of the motion vector data D2 into a single coded bitstream 3. This coded bitstream 3 is transmitted to the receiving ends, while being temporarily stored in a buffer memory 14a for data buffering. Here, the buffer occupancy, which indicates how much percent of the buffer memory 14a is filled with the coded bitstream 3, is fed back to the coding controller 12f, allowing the quantization step size to be recalculated for the next block.

In parallel to the above, a dequantizer 12g applies an inverse quantization (or dequantization) process to the quantizer 12d's outputs, or the quantized coded data D1, to reproduce the original DCT transform coefficients, whose low-digit fraction, however, has been lost in the quantization and dequantization processes. An IDCT unit 12h then subjects those DCT transform coefficients to an inverse DCT (IDCT) process, thereby reproducing prediction error D3. An adder 12i is used to add this prediction error D3 to the present frame's prediction picture D4 to obtain a local decoded picture F1. This picture F1 is saved into a frame memory 12j for future use.

Comparing the picture F0 of the present frame with the local decoded picture F1' of the previous frame read out from the frame memory 12j, a motion compensation unit 12k calculates motion vectors, and it then computes a motion-compensated prediction picture D4 by making the calculated motion vectors operate on the local decoded picture F1'. The motion vectors D2 are also delivered to the multiplexing unit 13c after being compressed by a variable-length coding unit 12m.

Here, a target area specifying unit 11 specifies a target area, i.e., which part of the source picture 2 should be subjected to the special effect generation process. This target area can be previously given or defined by an external source for each scene.

The target data relocation unit 13 (FIG. 1) is implemented as a combination of a target data extraction unit 13a, a variable-length coding unit 13b, and a multiplexing unit 13c. Out of the coded data D1, the target data extraction unit 13a extracts a target data D5 corresponding to the given target area. More specifically, the quantized DCT coefficients of blocks within the specified target area are identified, and then the high frequency components among them are extracted as the target data D5. The variable-length coding unit 13b compresses this target data D5 with variable-length coding techniques, and the multiplexing unit 13c inserts the target data D5 into the user data field, which is a prescribed data field as part of the output bitstream produced by the variable-length coding unit 12e.

Figure 4:
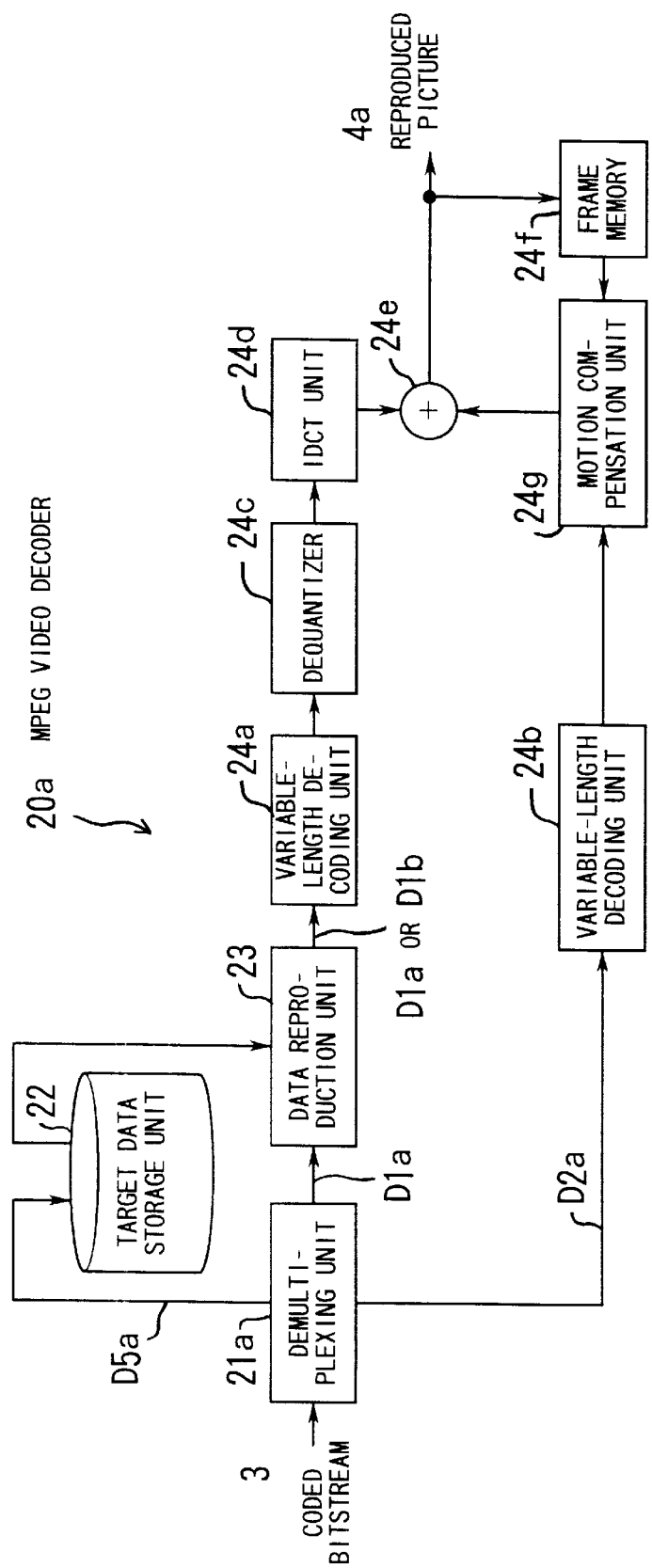
FIG. 4 is a block diagram of an MPEG video decoding apparatus where the present invention is embodied.

Referring next to a block diagram of FIG. 4, the following paragraphs will describe an MPEG video decoder 20a which works as a counterpart of the above-described MPEG video coder 10a.

This MPEG video decoder 20a receives the coded bitstream 3 sent from the MPEG video coder 10a. A demultiplexing unit 21a, serving as the target data extraction unit 21 of FIG. 1, separates the coded bitstream 3 into three parts: target data D5a, imperfect coded data D1a, and motion vectors D2a. The term "imperfect coded data" implies that it lacks some pieces of image information pertaining to the target area.

A target data storage unit 22 stores the target data D5a extracted by the demultiplexing unit 21a. When no special effect is required, a data reproduction unit 23 reproduces the original coded data D1b by recombining the target data D5a with the imperfect coded data D1a; that is, the target data D5a is restored to its original location. Alternatively, when the special effects are required, the data reproduction unit 23 outputs the imperfect coded data D1a as it is, without restoring the extracted target data D5a. With variable-length decoding algorithms, a variable-length decoding unit 24a selectively decompresses the imperfect coded data D1a or the original coded data D1b. On the other hand, another variable-length decoding unit 24b decompresses the motion vector data D2a.

A dequantizer 24c dequantizes the output data of the variable-length decoding unit 24a, and an IDCT unit 24d applies IDCT operations to the resultant values, thereby obtaining the prediction error. A motion compensation unit 24g generates a prediction picture by making the received motion vectors operate on a previous frame picture read out from a frame memory 24f. An adder 24e calculates the sum of this prediction picture and the prediction error supplied from the IDCT unit 24d to construct a reproduced picture 4a.

In should be noted that, when the special effects are required, the reproduced picture 4a is derived from the imperfect coded data D1a, which lacks the target data D5a containing high-frequency picture components that would represent the details of the specified target area. Due to the absence of such components, the reproduced image has lost sharpness, as well as exhibiting blocky appearance like mosaics. This is the special effect obtained in the "manipulated picture" 4. Since this effect is optional, the MPEG video decoder 20a can also reproduce normal pictures from the original coded data D1b containing the target data D5a, when no special effect is demanded.

The operation mode of the data reproduction unit 23 (i.e., which of the original coded data D1b and imperfect coded data D1a should be produced) can be controlled by an external command. For example, the MPEG video coder 10a can be configured to transmit a keyword to the MPEG video decoder 20a so that the data reproduction unit 23 will examine the validity of this keyword to determine which data to produce.

Figure 5:
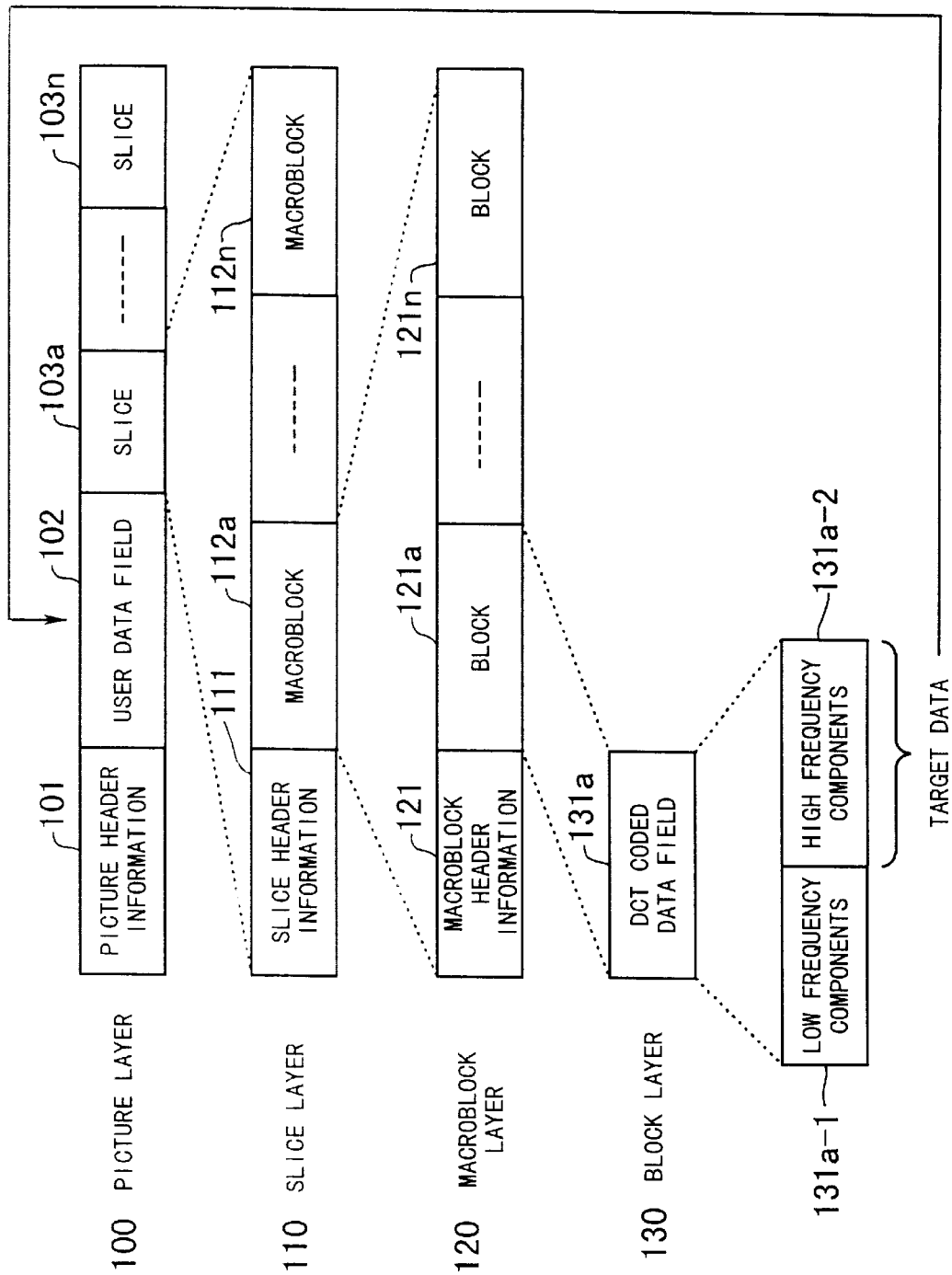
FIG. 5 is a diagram which shows the layered structure of a coded bitstream.

Now, the following paragraphs will explain the user data field mentioned earlier. FIG. 5 is a diagram which shows the layered structure of the coded bitstream 3, which includes: picture layer 100, slice layer 110, macroblock layer 120, and block layer 130. Here, the picture layer 100 is the highest in the hierarchy, while the block layer 130 is the lowest.

As the doted lines indicate, FIG. 5 schematically shows the hierarchical relationships among the layers. More specifically, in the picture layer 100, each picture consists of picture header information 101, a user data field 102 for arbitrary use, and a plurality of slices 103a to 103n. In the slice layer 110, each slice is composed of slice header information 111 and a plurality of macroblocks 112a to 112n. Likewise, in the macroblock layer 120, each macroblock is composed of macroblock header information 121 and a plurality of blocks 121a to 121n.

Concerning the block layer 130, each block contains DCT transform coefficients that represent the image of that block. Within this DCT coded data field 131a, the DCT transform coefficients are arranged in the order of spatial frequencies that they represents. Thus, the DCT coded data field 131a can be divided into two parts: low frequency components 131a-1 and high frequency components 131a-2. Those high frequency components 131a-2 are the very thing that has been referred to as the "target data." In the present invention, the high frequency components 131a-2 are transferred from the block layer 130 to the user data field 102 in the picture layer 100 before being sent to the receiving ends.

Figure 6:
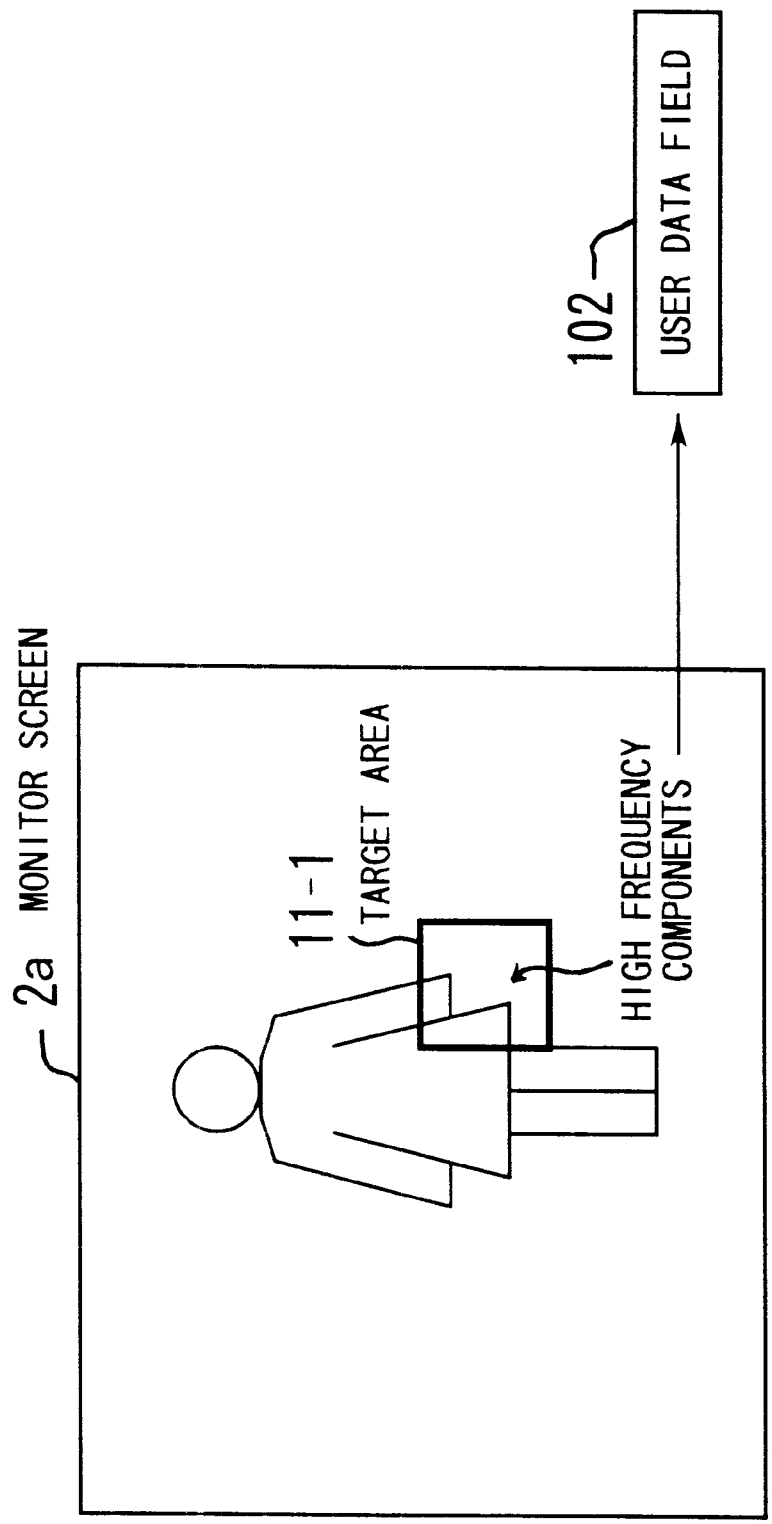
FIG. 6 is a conceptual view of the present invention, which shows how a special effect generation process is applied to a part of a given picture.

Referring to FIG. 6, the next paragraph will summarize the concept of the special effect generation process proposed in the present invention.

FIG. 6 illustrates a monitor screen 2a, in which a target area 11-1 is specified as the subject of special effects. The sender transmits the high frequency components of this target area 11-1 by packaging it in the user data field 102 of the coded bitstream. Since the user data field 102 is not the subject of decoding in the standard bitstream syntax, the receiving-end equipment decodes the video information without including these high frequency components. The resultant absence of detailed images produces a partially blurred picture which exhibits blocky appearance like mosaics.

As described above, the image processing system 1 of the present invention is designed to transmit the image of a specific target area while relocating their high frequency components to the user data field 102, so that the receiving end will decode the imperfect coded data lacking such components. This structural arrangement enables the system to yield special effects with a simple circuit in an efficient way, since it only has to move the high frequency components from their original location to a different location.

Figure 7:
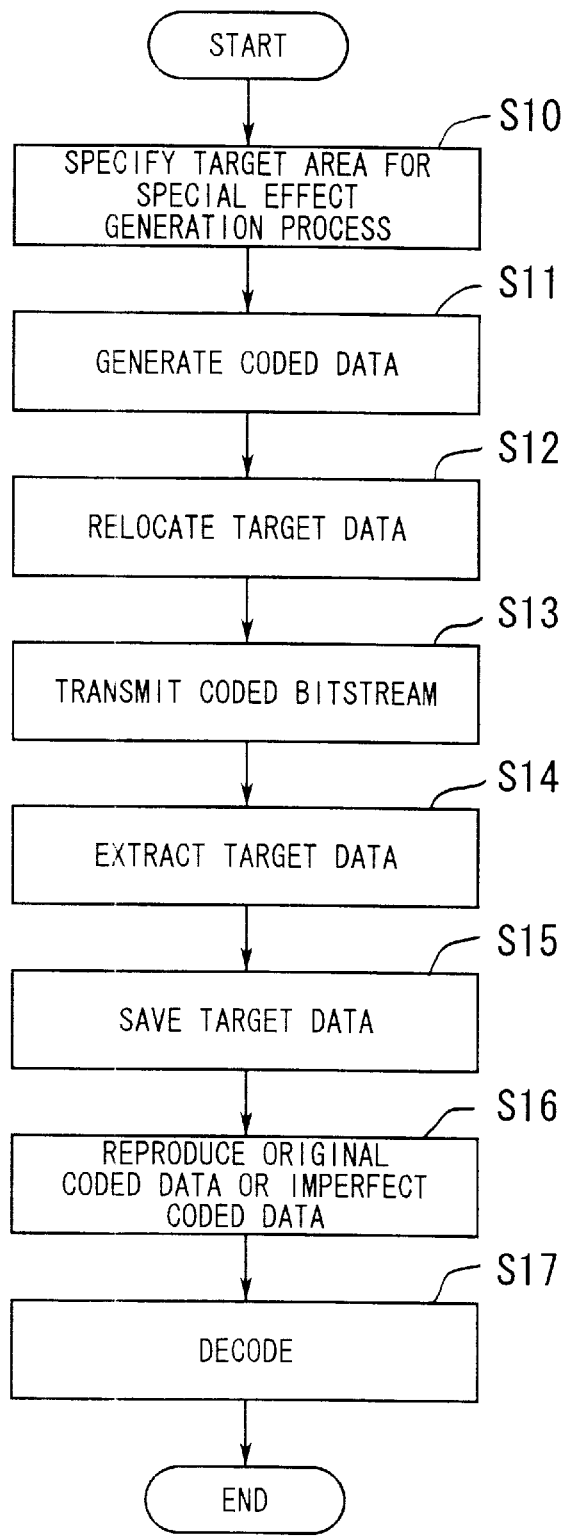
FIG. 7 is a flowchart which shows the procedure of an image processing method according to the present invention.

Referring next to a flowchart of FIG. 7, the following paragraphs will describe an image processing method according to the present invention. The process comprises the following steps.

(S10) A target area of given source pictures is specified as a subject of the special effect generation process.

(S11) Each source picture is compressed by DCT coding techniques, and coded data is produced.

(S12) Out of the coded data, "target data" for the given target area is extracted and relocated from its original location to a different location (e.g., user data field).

(S13) The modified coded data, or coded bitstream, is transmitted.

(S14) The target data is extracted from the coded bitstream.

(S15) The target data is saved into storage.

(S16) The original coded data is reproduced from the received coded bitstream by restoring the target data to its original field. Alternatively, imperfect coded data is reproduced from the received coded bitstream, without the target data restored.

(S17) The coded data or the imperfect coded data is selectively decoded.

As described above, the image processing method of the present invention is designed to transmit the image of a specific target area while relocating their high spatial frequency components to a different location, so that the receiving end will decode either the original coded data with the target data being restored or the imperfect coded data lacking the target data. This method yields special effects with a simple circuit in an efficient way, since it only has to move the high frequency components from their original location to a different location.

To summarize the entire description given above, the image processing system of the present invention is configured to transmit the image of a specific target area while relocating part of its components, or target data, to a different location, so that the receiving ends can selectively decode the original coded data including the target data being restored or the imperfect coded data lacking the target data. This system realizes the desired special effect with a simple circuit in an efficient way, since it only has to move the target data to a different location.

Further, the image data transmission apparatus of the present invention is configured to transmit the image data of a specific target area while relocating part of its components, or target data, to a different location. This structural arrangement enables the image data transmission apparatus to efficiently transmit manipulated pictures with a simple circuit, because special effects can be obtained by simply relocating target data.

Moreover, the image data reception apparatus of the present invention is configured to selectively decode the original coded data including the target data being restored to its original location or the imperfect coded data lacking the target data. This structural arrangement enables the apparatus to reproduce the original pictures or manipulated pictures in efficient ways.

Furthermore, the image processing method of the present invention transmits the image of a specific target area while relocating part of its components, or target data, to a different location, so that the receiving ends will decode either the original coded data with the target data being restored or the imperfect coded data lacking the target data. This method makes it possible to generate a desired special effect efficiently with a simple circuit, because it only has to move the target data to a different location.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing system for applying a special effect generation process to a given source picture, comprising:

(a) an image data transmission apparatus which comprises target area specifying means for specifying a target area of the given source picture that is to be subjected to the special effect generation process, image data coding means for generating coded data by encoding the source picture, target data relocating means for extracting target data from the coded data generated by said image data coding means and relocating the target data from an original field thereof to a different field of the coded data to obtain a coded bitstream for transmission, the target data being part of the coded data that is corresponding to the target area specified by said target area specifying means, and image data transmission means for transmitting the coded bitstream obtained by said target data relocating means; and (b) an image data reception apparatus which receives the coded bitstream from said image data transmission apparatus, comprising target data extracting means for extracting the target data from the received coded bitstream, target data storage means for storing the target data extracted by said target data extracting means, data reproducing means for reproducing original coded data from the received coded bitstream by restoring the target data into the original field thereof, or reproducing imperfect coded data from the received coded bitstream without restoring the extracted target data, and data decoding means for decoding the original coded data or the imperfect coded data supplied from said data reproducing means.

2. The image processing system according to claim 1, wherein said data reproducing means selectively reproduces either the original coded data or the imperfect coded data according to a selection command supplied from an external source.

3. The image processing system according to claim 1, wherein said image data coding means performs discrete cosine transform to encode the given source picture.

4. The image processing system according to claim 3, wherein said target data relocating means extracts a predetermined range of frequency components as part of the coded data and relocates the extracted predetermined range of frequency components to a user data field of the coded data.

5. An image data transmission apparatus for transmitting image data after applying a special effect generation process to a given source picture, comprising:

target area specifying means for specifying a target area of the given source picture that is to be subjected to the special effect generation process;

image data coding means for generating coded data by encoding the source picture;

target data relocating means for extracting target data from the coded data generated by said image data coding means and relocating the target data from an original field thereof to a different field of the coded data to obtain a coded bitstream for transmission, the target data being part of the coded data that is corresponding to the target area specified by said target area specifying means; and image data transmission means for transmitting the coded bitstream obtained by said target data relocating means.

6. An image data reception apparatus for receiving a coded bitstream containing manipulated coded data and target data, the target data being a part of original coded data corresponding to a specified area of a source image to be transmitted and has been relocated from an original field thereof to a different field to cause a special effect on the source image, the image data reception apparatus comprising:

target data extracting means for extracting the target data from the received coded bitstream;

target data storage means for storing the target data extracted by said target data extracting means;

data reproducing means for reproducing the original coded data from the received coded bitstream by restoring the target data into the original field, or reproducing imperfect coded data from the received coded bitstream without restoring the target data; and data decoding means for decoding the original coded data or the imperfect coded data supplied from said data reproducing means.

7. An image processing method for applying a special effect generation process to a source picture, comprising the steps of:

(a) specifying a target area of the given source picture as a subject of the special effect generation process;

(b) compressing the given source picture by using DCT coding techniques to produce coded data;

(c) extracting target data from the coded data, and relocating the target data to a different field of the coded data to obtain a coded bitstream for transmission, wherein the target data is part of the coded data that is corresponding to the target area;

(d) transmitting the coded bitstream;

(e) extracting the target data from the coded bitstream;

(f) saving the extracted target data into storage;

(g) reproducing original coded data from the coded bitstream by restoring the target data into an original location thereof, or reproducing imperfect coded data from the coded bitstream without restoring the extracted target data; and (h) decoding the coded data or the imperfect coded data.

8. The image processing method according to claim 7, wherein said step (b) of compressing the given source picture performs a discrete cosine transform.

9. The image processing method according to claim 8, wherein said step (c) of extracting the target data extracts a predetermined range of frequency components of the coded data and relocates the extracted predetermined range of frequency components to a user data field of the coded data.

10. An image data reception apparatus for receiving a coded bitstream containing manipulated coded data and target data, the target data being a predetermined range of frequency components of original coded data corresponding to a specified area of a source image to be transmitted and having been relocated from an original field thereof to a different field to cause a special effect on the source image, the image data reception apparatus comprising:

target data extracting means for extracting the target data from the received coded bitstream;

target data storage means for storing the target data extracted by said target data extracting means;

data reproducing means for reproducing the original coded data from the received coded bitstream by restoring the target data into the original field, or reproducing imperfect coded data from the received coded bitstream without restoring the target data; and data decoding means for decoding the original coded data or the imperfect coded data supplied from said data reproducing means.

* * * * *